US009781643B2

(12) United States Patent
Ekici et al.

(10) Patent No.: US 9,781,643 B2
(45) Date of Patent: Oct. 3, 2017

(54) METHODS FOR IMPROVED INTER-RADIO ACCESS TECHNOLOGY MEASUREMENTS

(75) Inventors: Ozgur Ekici, Ottawa (CA); Muhammad Khaledul Islam, Ottawa (CA)

(73) Assignee: BlackBerry Limited, Waterloo (CA)

( * ) Notice: Subject to any disclaimer, the term of this patent is extended or adjusted under 35 U.S.C. 154(b) by 556 days.

(21) Appl. No.: 13/415,305

(22) Filed: Mar. 8, 2012

(65) Prior Publication Data

US 2013/0235849 A1    Sep. 12, 2013

(51) Int. Cl.
| | |
|---|---|
| H04L 1/00 | (2006.01) |
| H04W 36/00 | (2009.01) |
| H04W 4/22 | (2009.01) |
| H04W 36/14 | (2009.01) |

(52) U.S. Cl.
CPC ....... H04W 36/0088 (2013.01); H04L 1/0023 (2013.01); H04L 2001/0096 (2013.01); H04W 4/22 (2013.01); H04W 36/14 (2013.01)

(58) Field of Classification Search
CPC ............ H04W 24/10; H04W 4/22; H04L 1/00
USPC ............ 370/310, 328, 331, 332, 389, 395.4; 455/436, 443
See application file for complete search history.

(56) References Cited

U.S. PATENT DOCUMENTS

| | | | | |
|---|---|---|---|---|
| 8,724,586 | B2 * | 5/2014 | Hallenstal | H04W 36/0022 |
| | | | | 370/331 |
| 8,903,327 | B2 * | 12/2014 | Garavaglia | H04L 1/0026 |
| | | | | 370/252 |
| 8,989,114 | B2 * | 3/2015 | Kim | H04L 5/0048 |
| | | | | 370/252 |
| 2003/0108027 | A1 | 6/2003 | Kim et al. | |
| 2005/0128972 | A1 * | 6/2005 | Kim | H04W 24/02 |
| | | | | 370/328 |
| 2007/0037601 | A1 * | 2/2007 | Mittal et al. | 455/525 |
| 2007/0071145 | A1 * | 3/2007 | Perets | H04L 1/20 |
| | | | | 375/346 |
| 2007/0097914 | A1 * | 5/2007 | Grilli et al. | 370/329 |
| 2008/0085710 | A1 | 4/2008 | Prateek | |
| 2008/0274742 | A1 | 11/2008 | Bi | |
| 2009/0022062 | A1 * | 1/2009 | Wang | H04W 36/0066 |
| | | | | 370/252 |

(Continued)

FOREIGN PATENT DOCUMENTS

| | | | | |
|---|---|---|---|---|
| EP | 2242300 A1 | 10/2010 | | |
| JP | 2009194805 | * | 8/2009 | ............ H04W 52/02 |

(Continued)

OTHER PUBLICATIONS

Canadian Office Action on Canadian Application No. 2,805,301, issued Jan. 29, 2014.

(Continued)

*Primary Examiner* — Mounir Moutaouakil
(74) *Attorney, Agent, or Firm* — Moffat & Co.

(57) ABSTRACT

A method at a mobile device for increasing measurement gaps to facilitate inter-radio access technology measurements is provided. The method at the mobile device: receiving inter-radio access technology (RAT) measurement configuration information from the network; when the device is actively connected, determining whether a triggering criterion is met, based on the received information; and if the triggering criterion is met, increasing the time available for measurements.

18 Claims, 6 Drawing Sheets

(56) References Cited

U.S. PATENT DOCUMENTS

| | | | |
|---|---|---|---|
| 2009/0135787 A1* | 5/2009 | Uemura | H04W 24/10 370/335 |
| 2010/0159950 A1 | 6/2010 | Toh | |
| 2010/0190487 A1 | 7/2010 | Wang et al. | |
| 2011/0105112 A1* | 5/2011 | Cave | H04W 36/0083 455/424 |
| 2011/0223957 A1* | 9/2011 | Pietraski | H04L 1/0001 455/514 |
| 2011/0274090 A1* | 11/2011 | Hallensal | H04W 36/0022 370/331 |
| 2011/0317635 A1* | 12/2011 | Swaminathan | H04W 36/0088 370/329 |
| 2013/0225177 A1* | 8/2013 | Wegmann | H04W 36/30 455/437 |

FOREIGN PATENT DOCUMENTS

| | | |
|---|---|---|
| WO | 2008000914 A1 | 1/2008 |
| WO | 2009046321 A2 | 4/2009 |
| WO | 2010107931 A2 | 9/2010 |
| WO | 2010113732 A1 | 10/2010 |

OTHER PUBLICATIONS

EP application No. 12158610.1, Extended European Search Report, dated Aug. 31, 2012.

3GPP TS 25.224 V9.4.0 (Mar. 2011), 3rd Generation Partnership Project; Technical Specification Group Radio Access Network; Physical layer procedures (TDD); (Release 9) section 4.11.2.

ETSI TS 125 123 V9.5.0 (Jul. 2011), Universal Mobile Telecommunications System (UMTS); Requirements for support of radio resource management (TDD) (3GPP TS 25.123 version 9.5.0 Release 9).

ETSI TS 145 008 V10.2.0 (Oct. 2011), Digital cellular telecommunications system (Phase 2+); Radio subsystem link control; (3GPP TS 45.008 version 10.2.0 Release 10).

ETSI TS 125 321 V10.4.0 (Nov. 2011), Universal Mobile Telecommunications System (UMTS); Medium Access Control (MAC) protocol specification; (3GPP TS 25.321 version 10.4.0 Release 10).

ETSI TS 125 222 V8.6.0 (Oct. 2009), Universal Mobile Telecommunications System (UMTS); Multiplexing and channel coding (TDD); (3GPP TS 25.222 version 8.6.0 Release 8) section 4.5.3.

Shaka, "Gap scheduling method based on minimum gap patterns in long term evolution system", http://shakaxi.wordpress.com/2010/10/12/gap-scheduling-method-based-on-minimum-gap-patterns-in-long-term-evolution-system/.

European Patent Office, Office Action on Application No. 12158610.1, Issued on Jun. 25, 2015.

Canadian Intellectual Property Office, Office Action, Application No. 2805301, Feb. 27, 2015.

European Patent Office, Office Action for Application No. 12158610.1, issued on Jan. 4, 2017.

* cited by examiner

METHODS FOR IMPROVED INTER-RADIO ACCESS TECHNOLOGY MEASUREMENTS

FIELD OF THE DISCLOSURE

The present disclosure relates generally to wireless devices, and in particular, to inter-Radio Access Technology (inter-RAT) measurements.

BACKGROUND

Wireless communication systems are widely deployed to provide various telecommunication services such as telephony, data, etc. The Universal Mobile Telecommunications System (UMTS) is a third generation (3G) cellular wireless technology developed by the $3^{rd}$ Generation Partnership Project (3GPP). The UMTS standard supports various air interfaces or radio access technologies (RATs) such as Wide-band Code Division Multiple Access (WCDMA) and Time Division Synchronous Code Division Multiple Access (TD-SCDMA).

In a typical wireless network deployment, 3G technology is overlaid on top of existing second generation (2G) wireless technologies. For example, an urban area may have radio link coverage from both 2G (such as the Global System for Mobile Communication (GSM)) and 3G (such as TD-SCDMA) whereas there may be only 2G coverage beyond the core urban area. Mobile devices are required to perform measurements of available RATs to provide seamless service. A mobile device seeing good TD-SCDMA downlink channel quality and requesting a high data rate in a High-Speed Downlink Packet Access (HSDPA) operation may be allocated with increased or all available downlink timeslots for its downlink traffic, leaving no or insufficient idle time periods for a reliable inter-RAT measurement. When such a mobile device moves closer to TD-SCDMA-GSM cell boundary, the inability or delay in performing GSM measurement may lead to dropping an ongoing service such as a voice call when the mobile device goes out of TD-SCDMA cell coverage.

BRIEF DESCRIPTION OF THE DRAWINGS

The present disclosure will be better understood with reference to the drawings, in which.

DETAILED DESCRIPTION

Figure 1:
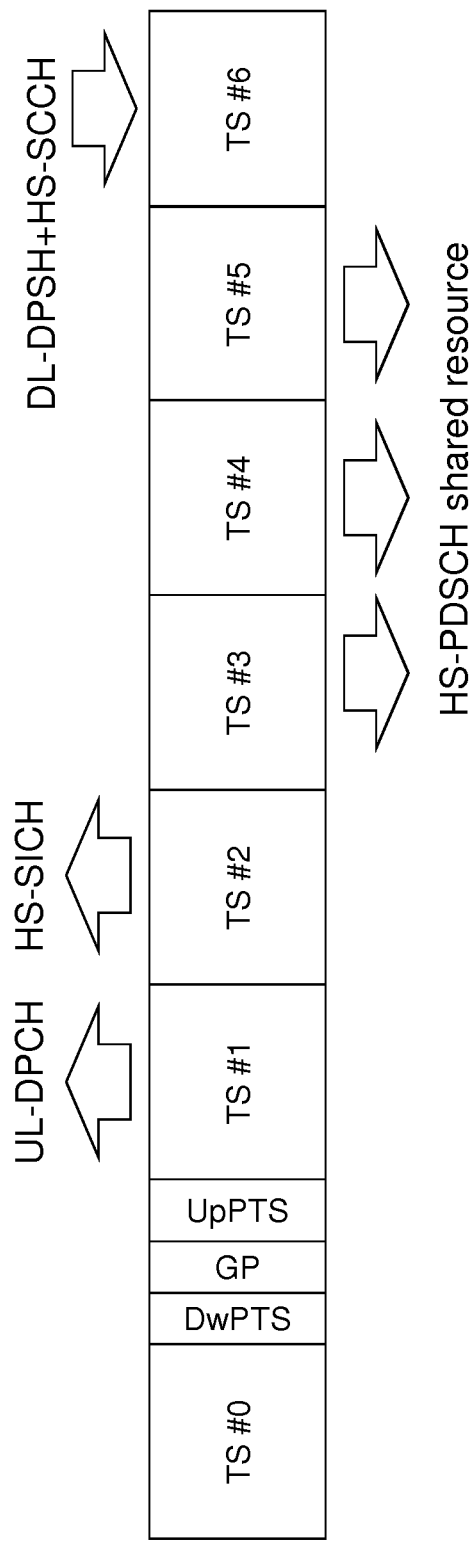
FIG. 1 illustrates HSDPA timeslot allocation in a typical live network.

The present disclosure provides a method at a mobile device, the method comprising: receiving inter-radio access technology (RAT) measurement configuration information from the network; when the device is actively connected, determining whether a triggering criterion is met, based on the received information; and if the triggering criterion is met, increasing the time available for measurements.

The present disclosure further provides a mobile device, comprising, a processor; and a communications subsystem, wherein the processor and communications subsystem cooperate to: receive inter-radio access technology (RAT) measurement configuration information from the network; when the device is actively connected, determine whether a triggering criterion is met, based on the received information; and if the triggering criterion is met, increase the time available for measurements.

In one aspect of the present disclosure, the time available for measurements is increased by increasing the number of slots available for measurement.

In one aspect of the present disclosure, the measurements are Inter-RAT measurements.

In one aspect of the present disclosure, the triggering criterion is met when deteriorating cell radio link quality is detected.

In one aspect of the present disclosure, the triggering criterion is met when measured Channel Quality Indicator (CQI) is less than a pre-determined threshold value.

In one aspect of the present disclosure, the increasing comprises reporting a lower than actual CQI value to the network.

In one aspect of the present disclosure, the triggering criterion is met when measured signal strength falls below a threshold value.

In one aspect of the present disclosure, the threshold value is determined based on statistical data collected by the mobile device.

In one aspect of the present disclosure, the triggering criterion is based on a mobility pattern of the mobile device.

In one aspect of the present disclosure, the increasing comprises indicating to the network a modulation format and a transport block size to lower downlink timeslot allocation requirements.

In one aspect of the present disclosure, the indicated modulation format is quadrature phase shift keying (QPSK) or 16-Quadrature Amplitude Modulation (16-QAM) or 64-Quadature Amplitude Modulation (64-QAM).

In one aspect of the present disclosure, the increasing comprises not reporting to the network that the mobile device supports HSDPA.

In one aspect of the present disclosure, the increasing comprises changing a reported capability of the mobile device to not support HSDPA.

While the present disclosure is described below with regard to a TD-SCDMA network, this is not meant to be limiting and the embodiments described could be equally applied to other networks in which channel measurements are delayed based on lack of sufficient time available to perform measurements. As used herein, the time available for measurements is also referred to as an idle period, idle gap, idle interval, idle time slots, or measurement gap.

In TD-SCDMA networks, a single transceiver mobile device can perform inter-RAT measurements only during measurement gaps. During multi-Radio Access Bearers (multi-RAB) operations, i.e., Packet Switched (PS) and Circuit Switched (CS) operations, or HSDPA operations, inter-RAT measurements can be delayed significantly or may not even be possible due to lack of availability of an adequate measurement gap in a given subframe.

For instance, for PS-only HSDPA operation, two timeslots are typically allocated for uplink (UL) and downlink (DL) dedicated physical channels (DPCH) carrying signaling radio bearers.

A High-Speed Common Control Channel (HS-SCCH) on the DL can be allocated on a separate timeslot or share the same timeslot as DL-DPCH.

A High-Speed Shared Information Channel (HS-SICH) on the UL can occupy a separate timeslot or can share the same timeslot as UL-DPCH.

During active data transfer, High-Speed Physical Downlink Shared Channel (HS-PDSCH), which carries end-user data can theoretically occupy five timeslots on the DL. In practice, an HS-PDSCH typically occupies three timeslots on the DL. In accordance with the present disclosure, a device is actively connected during data transfer, and this may, for example, occur while the device is in CELL_DCH mode in one example.

In a scenario including mobile device mobility on radio access technology (RAT) borders, such timeslot allocation may make inter-RAT (such as GSM) measurements difficult or impossible, causing call drops due to the mobile device not being able to perform timely and reliable inter-RAT measurements and thereby not being able to perform inter-RAT handover.

According to 3GPP TS 25.123, a dual mode (TD-SCDMA and GSM/GPRS/EDGE) mobile device may be able to monitor up to 32 GSM cells distributed on 32 GSM carriers. Considering the fact that a typical TD-SCDMA cell size is quite small (typically 300 m to 1 km), reliable and fast inter-RAT measurements are quite critical to provide similar service.

As an example, a HSDPA timeslot allocation as well as allocation of relevant physical channels in a typical commercial network is illustrated in FIG. 1. In FIG. 1, timeslot (TS) #0 is used for intra- and inter-frequency TD-SCDMA measurements. UL-DPCH is dedicated and occupies TS #1. In TS #2, HS-SICH is transmitted if there is data on the HSDPA DL for the mobile device in the previous timeslot. TS #2 can be used for inter-RAT measurements when there is no HSDPA DL data for the mobile device in the previous timeslot. TS #3, TS#4, and TS #5 are used for DL shared channel. These timeslots can be used for inter-RAT measurements when there is no data for the mobile device. DL-DPCH is dedicated and occupies TS #6. If high-speed (HS) data flow is continuous, then the mobile device utilizing the allocation above will not be able to perform any inter-RAT measurement due to the absence of time for measurement.

Accordingly, in one embodiment of the present disclosure, radio resource requirements can be reduced by having a mobile device artificially reporting a lower than actual Channel Quality Indicator (CQI) value to the network, implicitly requesting a smaller transport block size for a given modulation format. In an alternative embodiment, a mobile device may not report to the network that the mobile device supports HSDPA or may declare to the network that the mobile device no longer supports HSDPA. Each of these embodiments is described below.

Thus, by reducing radio resource requirements for a given connection, measurement gaps are created which enable more timely and/or frequent inter-RAT measurements to be made.

The term "mobile device", as used herein, could be any wireless device, including, but not limited to a mobile station, user equipment (UE), personal digital assistant, data enabled cellular telephone, pager, laptop, among others.

Figure 2:
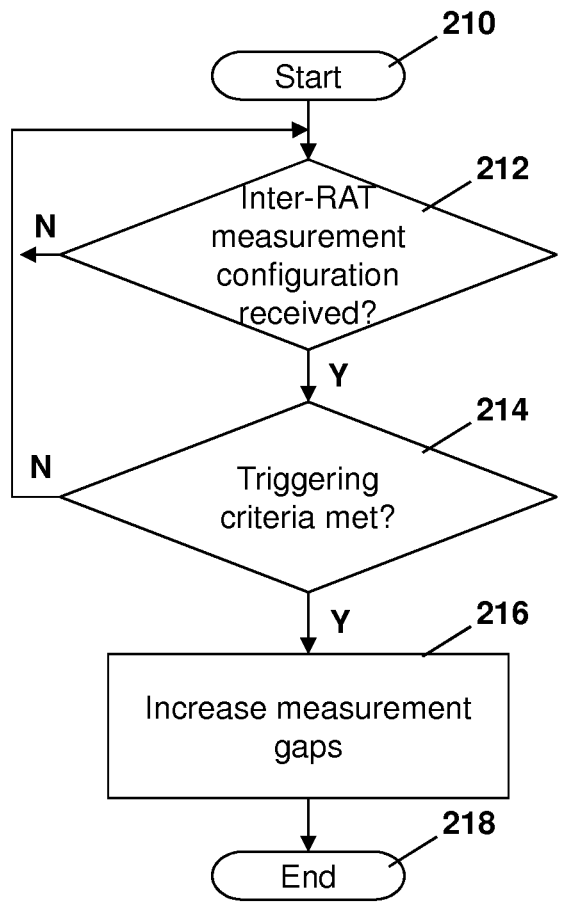
FIG. 2 is a process diagram illustrating an embodiment of the present disclosure to increase measurement gaps for improved inter-RAT measurements.

Reference is now made to FIG. 2 which shows an embodiment of the present disclosure for increasing measurement gaps for inter-RAT measurements.

The process of FIG. 2 starts at block 210 and proceeds to block 212 in which the mobile device checks whether inter-RAT measurement configuration is received. If yes, the process then proceeds to block 214. Otherwise, the process loops back to block 212.

At block 214, the mobile device checks whether triggering criteria for the present method are met. For example, the triggering criteria might be a cell radio link quality threshold. The triggering criteria might therefore be met when a deteriorating cell radio link quality is detected, for example in the case when the mobile device approaches cell boundary or when the mobile device is within a RAT which has a spotty coverage.

In one embodiment, the triggering criterion in block 214 is met when the CQI value falls below a pre-determined threshold value.

In another embodiment, the triggering criterion is met when the signal strength from the serving cell falls below a threshold value determined from statistical data collected by the mobile device. For example, the mobile device can autonomously decide from experience or collected statistical data that if signal strength of the TD-SCDMA serving cell drops below a certain dBm value, then the probability of dropping CS calls in a TD-SCDMA cell is high.

In yet another embodiment, the triggering criterion could be based on a certain mobility pattern of the mobile device or statistical intelligence that the mobile device has. For instance, if in a given TD-SCDMA cell, the mobile device keeps dropping CS calls upon crossing the inter-RAT boundary and later finds a cell in a 2G network, then the next time when the mobile device encounters similar mobility pattern, the mobile device may recognize that the triggering criterion is met.

A person skilled in the art will appreciate that other triggering criteria may also be used to indicate deteriorating cell radio link quality or that longer measurement gaps are required to enable or accelerate inter-RAT measurements.

If the triggering criterion in block 214 is met, then the process proceeds to block 216 to create longer measurement gaps that can be used for inter-RAT measurements. Otherwise, if the triggering criterion is not met in block 214, the process loops back to block 212.

More details are provided below to describe some of the embodiments in block 216 when a triggering criterion in block 214 is met, e.g., when the Cell Quality Indicator (CQI) falls below a pre-determined threshold value.

In an embodiment of the present disclosure, at block 214, during the course of HSDPA operation, if the mobile device notices that the serving TD-SCDMA signal strength falls below a pre-determined threshold value and inter-RAT measurement is configured, then at block 216, the mobile device may artificially report a lower CQI value to the network, causing the serving TD-SCDMA base station to decrease downlink PS data rate. The decreased PS data rate is expected to result in a reduction of allocated timeslots for HS-PDSCH, thereby creating longer measurement gaps for inter-RAT measurements.

In another embodiment, at block 216, the mobile device indicates a recommended modulation format (for example quadrature phase shift keying (QPSK) or 16 quadrature amplitude modulation (16-QAM) or 64 quadrature amplitude modulation (64-QAM)) and a transport block size in the HS-SICH message that can free up radio resources. For instance, given a certain transport block size, choosing 16-QAM over QPSK will free up radio resources. Similarly, for a given modulation format, indicating a smaller transport block size in the HS-SICH message will reduce radio resource requirements, thereby providing more measurement gaps.

In yet another embodiment, at block 216, the mobile device does not report certain capabilities such as the ability to receive on HSDPA when it reports its capability to the network, or the mobile device changes its capability declaring that it no longer supports a feature such as HSDPA through a message such as the UE Capability Update message on the uplink. When the mobile device then receives the UE Capability Inform Confirm message on the downlink, the UTRAN is expected to downgrade the mobile device PS connection to DP DCH (rather than HS-PDSCH) where more measurement gaps can be used to accelerate and/or enhance inter-RAT measurements.

From block 216, the process then proceeds to block 218 where the process ends.

An example is provided below to illustrate how an embodiment of the present disclosure can increase measurement gaps to enhance inter-RAT measurements.

According to 3GPP TS 25.123, the contents of which are incorporated herein by reference, 2G measurement periods are defined as 480 ms. During this duration, the mobile device performs 2G measurements depending on the availability of measurement gaps. In practice, mobile devices cannot perform measurements at each subframe (5 ms), but rather in multiples of subframes called "measurement scheduling period" of ~40 ms.

Figure 3:
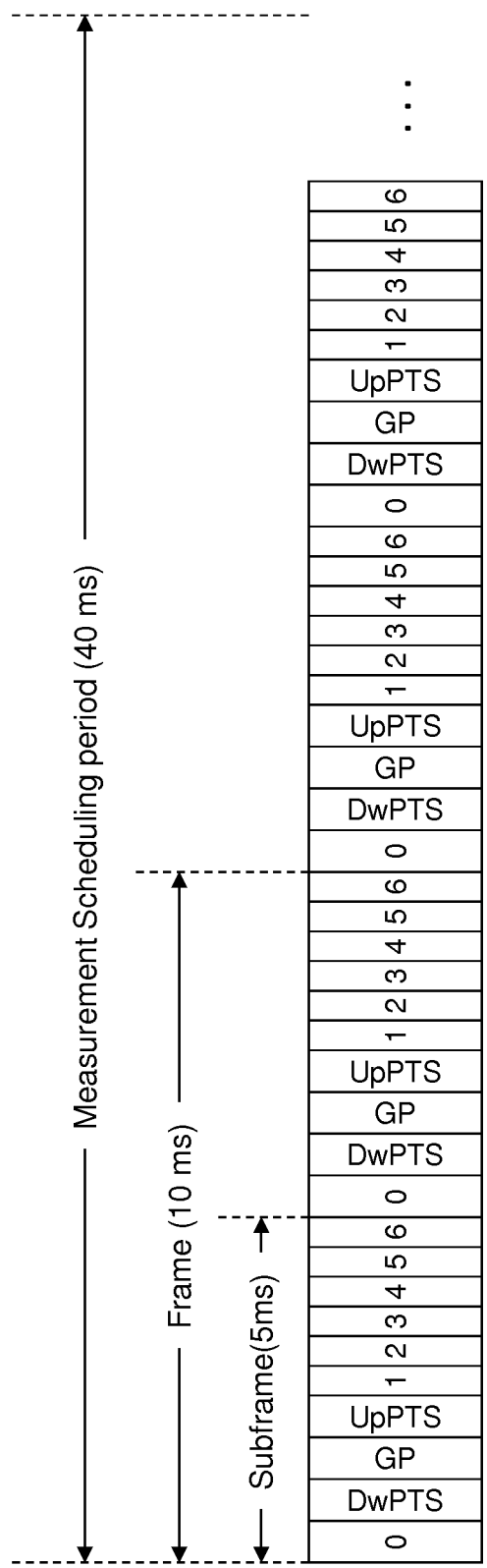
FIG. 3 illustrates an example of timeslot allocation for HSDPA high data rate scenario.

Reference is now made to FIG. 3. Within a measurement scheduling period, the mobile device performs various types of measurements, including serving cell, intra-frequency, inter-frequency and inter-RAT.

In order for the mobile device to meet the measurement accuracy requirements as defined in 3GPP TS 45.008, the mobile device will take at least 3 GSM carrier received signal strength indication (RSSI) samples per GSM carrier in the monitored set during the measurement period of 480 ms. The mapping of the number of GSM carrier RSSI samples in each measurement gap to measurement gap length (or IDLE timeslots) is provided in Table 1:

TABLE 1

Measurement gap length to GSM carrier RSSI sample mapping

| Measurement Gap Length (timeslots [TS]) | Number of GSM carrier RSSI samples in each measurement gap |
| --- | --- |
| 3 | 1 |
| 4 | 2 |
| 5 | 3 |

Referring to Table 1, if there is a measurement gap length of 4 timeslots then the mobile device should be able to collect 2 RSSI samples per carrier. This is a minimum requirement. In practice, some UE implementations may be able to collect 1 RSSI sample per carrier in a measurement gap of 2 timeslots.

Consider a numeric example taking into account Table 1 and the following:
GSM measurement period=480 ms
Measurement scheduling period=40 ms
A reliable/accurate GSM carrier measurement requires 3 carrier RSSI samples
Different timeslot allocation scenarios (from sample live network log):
  i. Scenario 1: HSDPA high data rate
  ii. Scenario 2: HSDPA low data rate
  iii. Scenario 3: DPDCH data rate (one DL and one UL TS allocated)

In this numeric example, the number of GSM carriers a mobile device can reliably measure is calculated in each of the above scenarios to illustrate the benefits of the present methods and systems.

Scenario 1: HSDPA High Data Rate (Problematic Use Case):

Timeslot allocation for HSDPA high data rate scenario is illustrated in FIG. 3 as follows: TS #1 and TS #2 are assigned for UL. TS #3, TS #4, TS #5 and TS #6 are assigned for DL. TS #0 is used for serving cell intra-frequency and inter-frequency measurements. As shown in FIG. 3, if there is no interruption to the data flow during the GSM measurement period, there will be no IDLE interval for GSM carrier RSSI measurement. The mobile device will not be able to perform any GSM inter-RAT measurement regardless of the information conveyed in the Measurement Control message or pre-configured System Information Block 11 or 12. In case of sudden signal strength loss in the TD-SCDMA system, the mobile device will not be able to perform timely inter-RAT measurement, which may result in call drops as a result of not being able to trigger inter-RAT handover.

Figure 4:
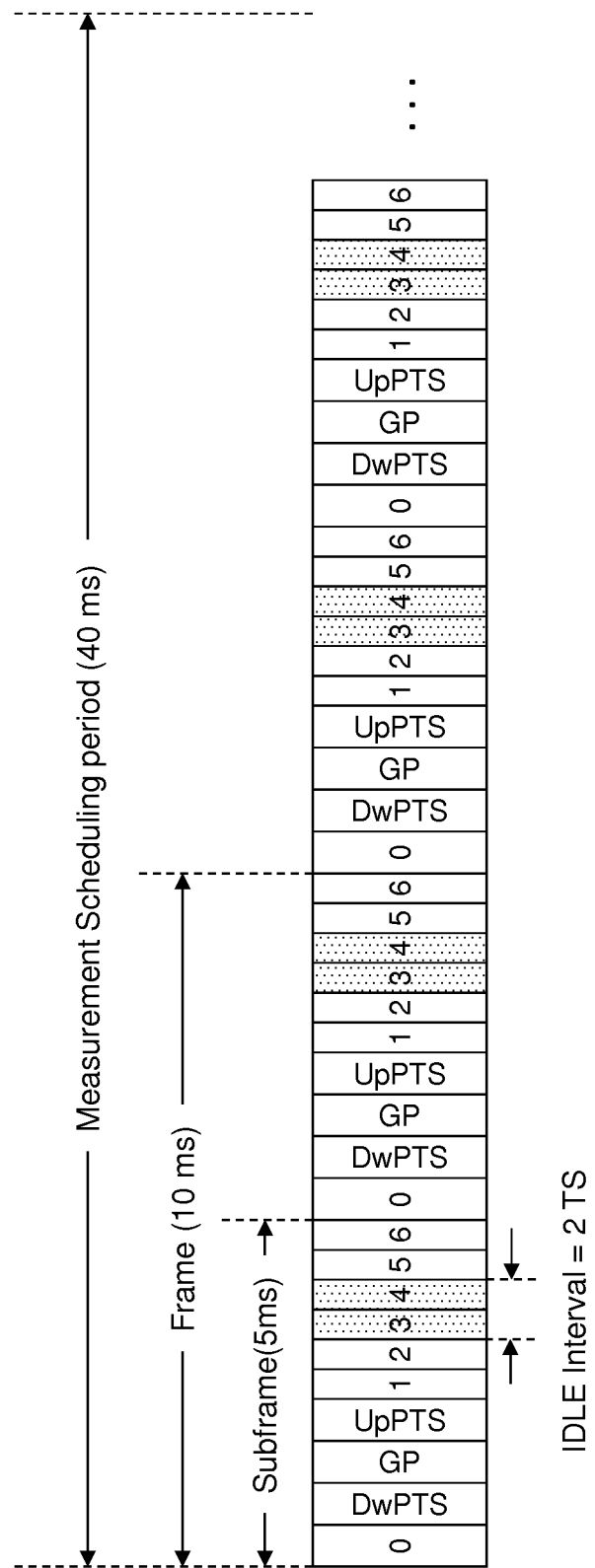
FIG. 4 illustrates an example of timeslot allocation for HSDPA low data rate resulting from the application of an embodiment of the present disclosure.

Scenario 2: HSDPA Low Data Rate:

Using an embodiment of the present method, the mobile device can indirectly decrease the DL data rate, for example by reporting lower-than-actual CQI. FIG. 4 illustrates an example of TS allocation where the mobile device indirectly reduces the DL data rate so that 2 timeslots are freed up in the first subframe. In this scenario, the DL user data on an HSDPA channel is sent only on TS #5 and TS #6. The 2 IDLE timeslots, i.e., TS #3 and TS #4, are enough to obtain a single GSM carrier RSSI sample. If the mobile device performs single inter-RAT measurement in a given measurement scheduling period, then in a GSM measurement period of 480 ms, the mobile device can collect 12 GSM carrier RSSI samples. 12 GSM carrier RSSI measurements are enough for 4 reliable GSM carrier measurements (12 GSM carrier RSSI samples/3 GSM carrier RSSI samples per GSM carrier).

Figure 5:
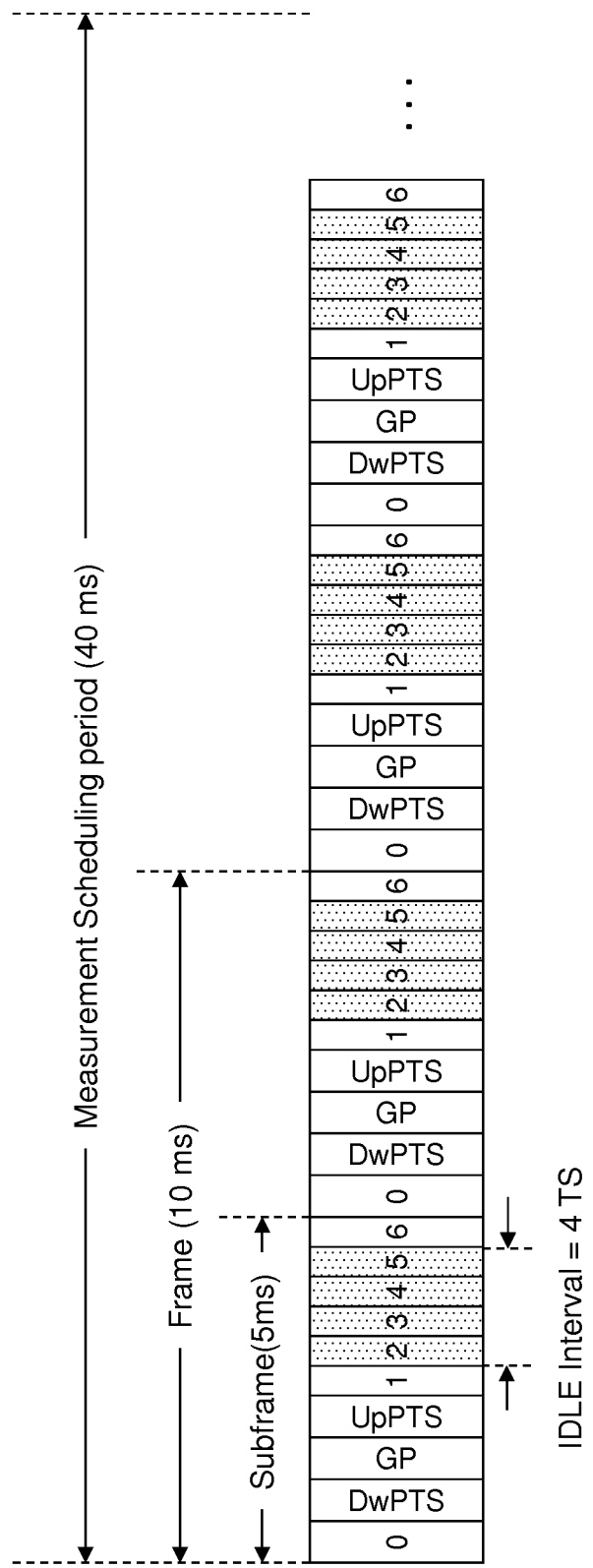
FIG. 5 illustrates another example of timeslot allocation for HSDPA low data rate resulting from the application of yet another embodiment of the present disclosure.

Scenario 3: HSDPA Low Data Rate:

In the example of Scenario 3, when the mobile device approaches the RAT boundary, the mobile device downgrades its HSDPA capability through the UE Capability Update procedure in order to improve inter-RAT measurements. The mobile device either does not report its HSDPA capability to the network during connection establishment, or changes its capability on the fly to declare that it no longer supports HSDPA feature using the mobile device capability modification procedure as defined in 3GPP TS 25.331 section 8.1.6. This will provide more IDLE timeslots for inter-RAT measurements. In order to support 64 kbps UL and DL data rate, single timeslot assignment for each direction is sufficient. In FIG. 5, for example, TS #1 is assigned for UL and TS #6 is assigned for DL. If the mobile device performs a single inter-RAT measurement in each measurement scheduling period of 40 ms, the mobile device will have 4 timeslots to perform inter-RAT measurement. Referring to Table 1, a measurement gap length of 4 timeslots is sufficient for 2 GSM carrier RSSI samples. Therefore, during a GSM measurement period of 480 ms, the mobile device will be able to collect 24 GSM carrier RSSI samples which will be sufficient for 8 reliable GSM carrier measurements.

As will be appreciated by those in the art, the three scenarios above are merely provided as examples. In other scenarios the recommended modulation format and transport block size could be varied to create idle time slots. This could be combined with the examples of the scenarios above.

The various embodiments of the present method can be applied to increase the measurement gaps to facilitate inter-RAT measurements in a timely manner while on a TD-SCDMA system. Further, the methods may be applied both when a mobile device approaches a RAT boundary, and in other scenarios such as when a mobile device is within a RAT with spotty radio coverage. For instance, an established 2G network may provide seamless coverage in a given area. However, a TD-SCDMA network may have a spotty coverage. In the middle of a city, a mobile device that falls into a coverage hole within the TD-SCDMA network can only receive service from the 2G system. Therefore, in a handover scenario, the present method provides performance improvements not only along the RAT boundary but also within a RAT.

The above therefore provides for a mobile system in which a mobile device can increase the measurement gaps to allow for inter-RAT measurements. The measurement gaps can be created when a triggering criteria is met, such as, for example, channel conditions being below a threshold.

The increase in measurement gaps may be accomplished in various ways. For example, the reported channel quality can be artificially lowered at the mobile device to cause the network to reduce data throughput and thus create measurement gaps. Further, certain modulation schemes can be recommended by the mobile device to reduce the number of timeslots to be used and enable longer measurement gaps. Also, a transport block size can be recommended by the mobile device, whereby choosing a smaller transport block size requires less downlink timeslots and enables longer measurement gaps.

Also, certain capabilities of the mobile device can be suppressed, either by not reporting such capabilities or by signalling that such capabilities are no longer available. The suppression of the capabilities can create further IDLE intervals. For example, if the capability is HSDPA, a mobile indicating it does not support HSDPA can increase the number of measurement gaps per subframe.

Figure 6:
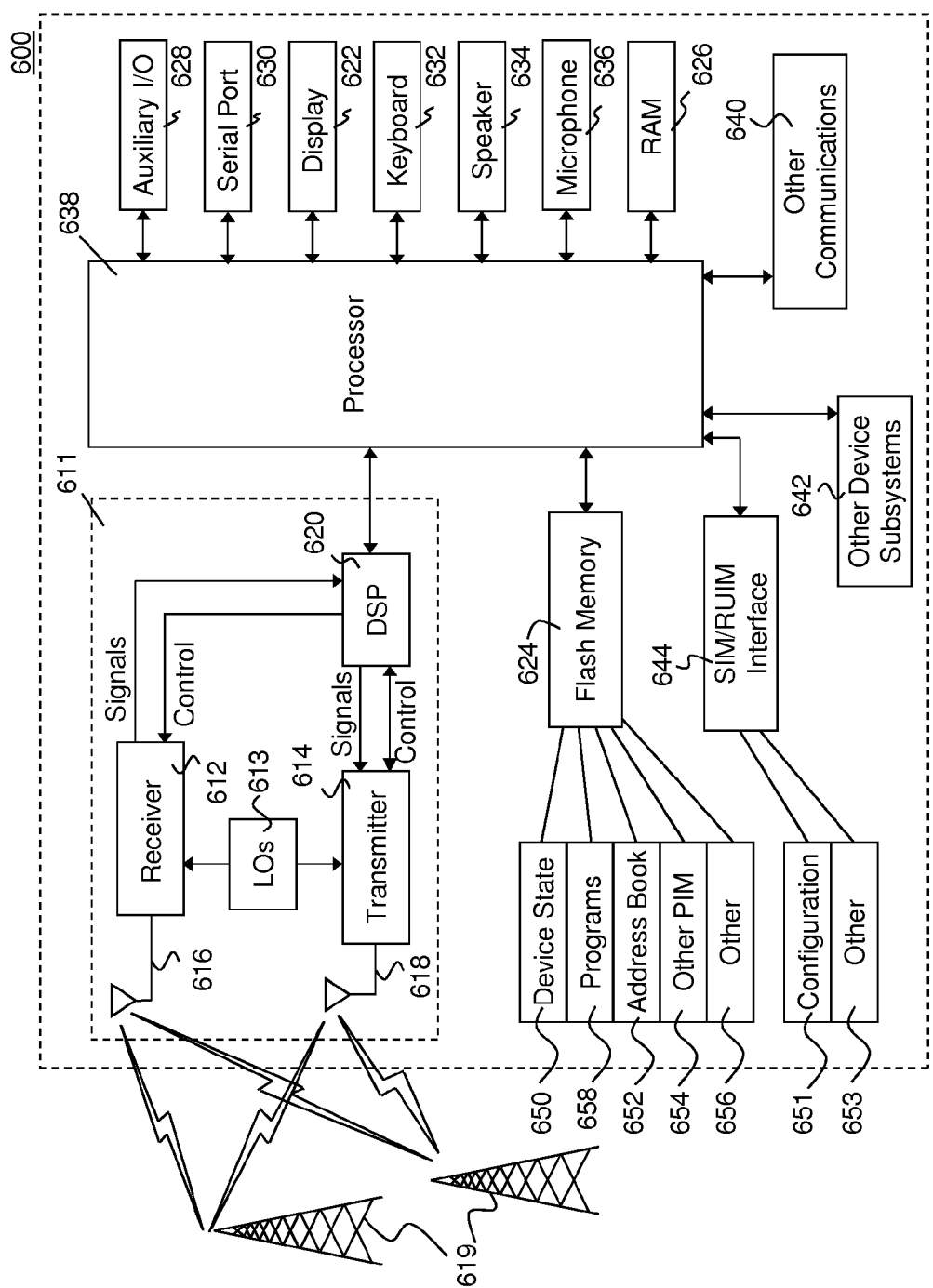
FIG. 6 is a block diagram showing an example multi-mode mobile device used with the present disclosure.

An exemplary multi-mode mobile device for use with the embodiments above is illustrated with reference to FIG. 6. The multi-mode mobile device of FIG. 6 is however not meant to be limiting, but is provided for illustrative purposes. Other multi-mode mobile devices could also be used.

Multi-mode mobile device 600 is typically a two-way wireless communication device having at least voice and data communication capabilities. Multi-mode mobile device 600 may have the capability to communicate with other computer systems on the Internet. Depending on the exact functionality provided, the mobile device 600 may be referred to as a data messaging device, a two-way pager, a wireless e-mail device, a cellular telephone with data messaging capabilities, a wireless Internet appliance, a wireless device, a user equipment, or a data communication device, as examples.

Where mobile device 600 is enabled for two-way communication, it can incorporate a communication subsystem 611, including both a receiver 612 and a transmitter 614, as well as associated components such as one or more antenna elements 616 and 618, local oscillators (LOs) 613, and a processing module such as a digital signal processor (DSP) 620. In some embodiments, communication subsystem 611 may allow for communications with a plurality of RATs. In other embodiments, one or more further communications subsystem 640 supporting other RATs could be provided on mobile device 600. As will be apparent to those skilled in the field of communications, the particular design of the communication subsystem 611 or 640 will be dependent upon the communication network in which the device is intended to operate. For example, mobile device 600 may include a communication subsystem 611 designed to operate within the GPRS network or UMTS network. In some embodiments, a mobile device 600 supporting WiFi could include a further communications subsystem 650.

Network access requirements will also vary depending upon the type of network 619. For example, In UMTS and GPRS networks, network access is associated with a subscriber or user of mobile device 600. For example, a GPRS mobile device therefore requires a subscriber identity module (SIM) card in order to operate on a GPRS network. In UMTS a USIM or SIM module is required. In CDMA a removable user identity module (RUIM) card or a SIM card is required. These will be referred to as a UIM interface herein. Without a valid UIM interface, a mobile device may not be fully functional. Local or non-network communication functions, as well as legally required functions (if any) such as emergency calling, may be available, but mobile device 600 will be unable to carry out any other functions involving communications over the network 619. The UIM interface 644 is normally similar to a card-slot. The UIM card can hold many key configuration 651, and other information 653 such as identification, and subscriber related information.

When required network registration or activation procedures have been completed, mobile device 600 may send and receive communication signals over the network 619. Signals received by antenna 616 through communication network 619 are input to receiver 612, which may perform such common receiver functions as signal amplification, frequency down conversion, filtering, channel selection and the like, and in the example system shown in FIG. 6, analog to digital (A/D) conversion. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Network 619 may further communicate with multiple systems, including a server and other elements (not shown). For example, network 619 may communicate with both an enterprise system and a web client system in order to accommodate various clients with various service levels.

Mobile device 600 can include a microprocessor 638 which controls the overall operation of the device. Communication functions, including data and voice communications, are performed through communication subsystem 611. Microprocessor 638 also interacts with further device subsystems such as the display 622, flash memory 624, random access memory (RAM) 626, auxiliary input/output (I/O) subsystems 628, serial port 630, keyboard 632, speaker 634, microphone 636, a short-range communications subsystem 640 and any other device subsystems generally designated as 642. Microprocessor 638 can further interact with communications subsystem 611 and with software stored in a memory such as flash memory 624 to perform the methods described herein.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the microprocessor 638 may be stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626. Further, a unique identifier is also preferably stored in read-only memory.

As shown, flash memory 624 can be segregated into different areas for both computer programs 658 and program data storage 652, 654 and 656. These different storage types indicate that each program can allocate a portion of flash memory 624 for their own data storage requirements. Microprocessor 638, in addition to its operating system functions, may enable execution of software applications on the mobile device. A predetermined set of applications that control basic operations, including data and voice communication applications for example, may be installed on mobile device 600 during manufacturing. One software application may be a personal information manager (PIM) application having the ability to organize and manage data items relating to the user of the mobile device such as, but not limited to, e-mail, calendar events, voice mails, appointments, and task items. Other applications may include multimedia application, social networking applications, instant messaging application, among others.

In a data communication mode, a received signal such as a text message or web page download may be processed by the communication subsystem 611 and input to the microprocessor 638, which may further process the received signal for output to the display 622, or alternatively to an auxiliary I/O device 628. A user of mobile device 600 may also compose data items such as email messages for example, using the keyboard 632, which in one embodiment is a complete alphanumeric keyboard or telephone-type keypad, in conjunction with the display 622 and possibly an auxiliary I/O device 628. Such composed items may then be transmitted over a communication network through the communication subsystem 611.

For voice communications, overall operation of mobile device 600 is similar, except that received signals would typically be output to a speaker 634 and signals for transmission would be generated by a microphone 636. Alternative voice or audio I/O subsystems, such as a voice message recording subsystem, may also be implemented on mobile device 600. Although voice or audio signal output is generally accomplished primarily through the speaker 634, display 622 may also be used to provide an indication of the identity of a calling party, the duration of a voice call, or other voice call related information for example.

Serial port 630 in FIG. 6 would normally be implemented in a personal digital assistant (PDA)-type mobile device for which synchronization with a user's desktop computer (not shown) may be desirable. Such a port 630 would enable a user to set preferences through an external device or software application and would extend the capabilities of mobile device 600 by providing for information or software downloads to mobile device 600 other than through a wireless communication network. The alternate download path may for example be used to load an encryption key onto the device through a direct and thus reliable and trusted connection to thereby enable secure device communication.

Alternatively, serial port 630 could be used for other communications, and could include as a universal serial bus (USB) port. An interface is associated with serial port 630.

Other communications subsystems 640, such as a short-range communications subsystem, is a further optional component which may provide for communication between mobile device 600 and different systems or devices, which need not necessarily be similar devices. For example, the subsystem 640 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a mobile device, the method comprising:
receiving inter-radio access technology (RAT) measurement configuration information from the network;
when the device is actively connected, determining whether a triggering criterion is met, based on the received information;
if the triggering criterion is met, increasing a time available for measurements, the increasing comprising:
reporting an incorrect capability to the network, the incorrect capability indicating that the mobile device does not support High-Speed Downlink Packet Access (HSDPA) while the mobile device does support HSDPA; and
indicating to the network a modulation format and a transport block size to lower downlink timeslot allocation requirements.

2. The method of claim 1, wherein the time available for measurements is increased by increasing the number of slots available for measurement.

3. The method of claim 1, wherein the measurements are Inter-RAT measurements.

4. The method of claim 1, wherein the triggering criterion is met when deteriorating cell radio link quality is detected.

5. The method of claim 1, wherein the triggering criterion is met when measured CQI is less than a pre-determined threshold value.

6. The method of claim 1, further comprising reporting a lower than actual CQI value to the network.

7. The method of claim 1, wherein the triggering criterion is met when measured signal strength falls below a threshold value.

8. The method of claim 7, wherein the threshold value is determined based on statistical data collected by the mobile device.

9. The method of claim 1, wherein the triggering criterion is based on a mobility pattern of the mobile device.

10. The method of claim 1, wherein the indicated modulation format is quadrature phase shift keying (QPSK) or 16-Quadrature Amplitude Modulation (16-QAM) or 64-Quadature Amplitude Modulation (64-QAM).

11. A mobile device comprising,
a processor; and
a communications subsystem,
wherein the processor and communications subsystem cooperate to:
  receive inter-radio access technology (RAT) measurement configuration information from the network;
  when the device is actively connected, determine whether a triggering criterion is met, based on the received information;
  if the triggering criterion is met, increasing a time available for measurements, the increasing comprising:
  reporting an incorrect capability to the network, the incorrect capability indicating that the mobile device does not support High-Speed Downlink Packet Access (HSDPA) while the mobile device does support HSDPA; and
  indicating to the network a modulation format and a transport block size to lower downlink timeslot allocation requirements.

12. The mobile device of claim 11, wherein the time available for measurements is increased by increasing the number of slots available for measurement.

13. The mobile device of claim 11, wherein the measurements are Inter-RAT measurements.

14. The mobile device of claim 11, wherein the triggering criterion is met when measured CQI is less than a predetermined threshold value.

15. The mobile device of claim 14, wherein the processor and communications subsystem further cooperate to report a lower than actual CQI value to the network.

16. The mobile device of claim 11, wherein the triggering criterion is met when measured signal strength falls below a threshold value.

17. The mobile device of claim 11, wherein the triggering criterion is based on a mobility pattern of the mobile device.

18. The mobile device of claim 11, wherein the triggering criterion is met when deteriorating cell radio link quality is detected.

* * * * *